May 5, 1931.   L. LA RIZZA   1,803,397
AMUSEMENT DEVICE
Filed April 3, 1930
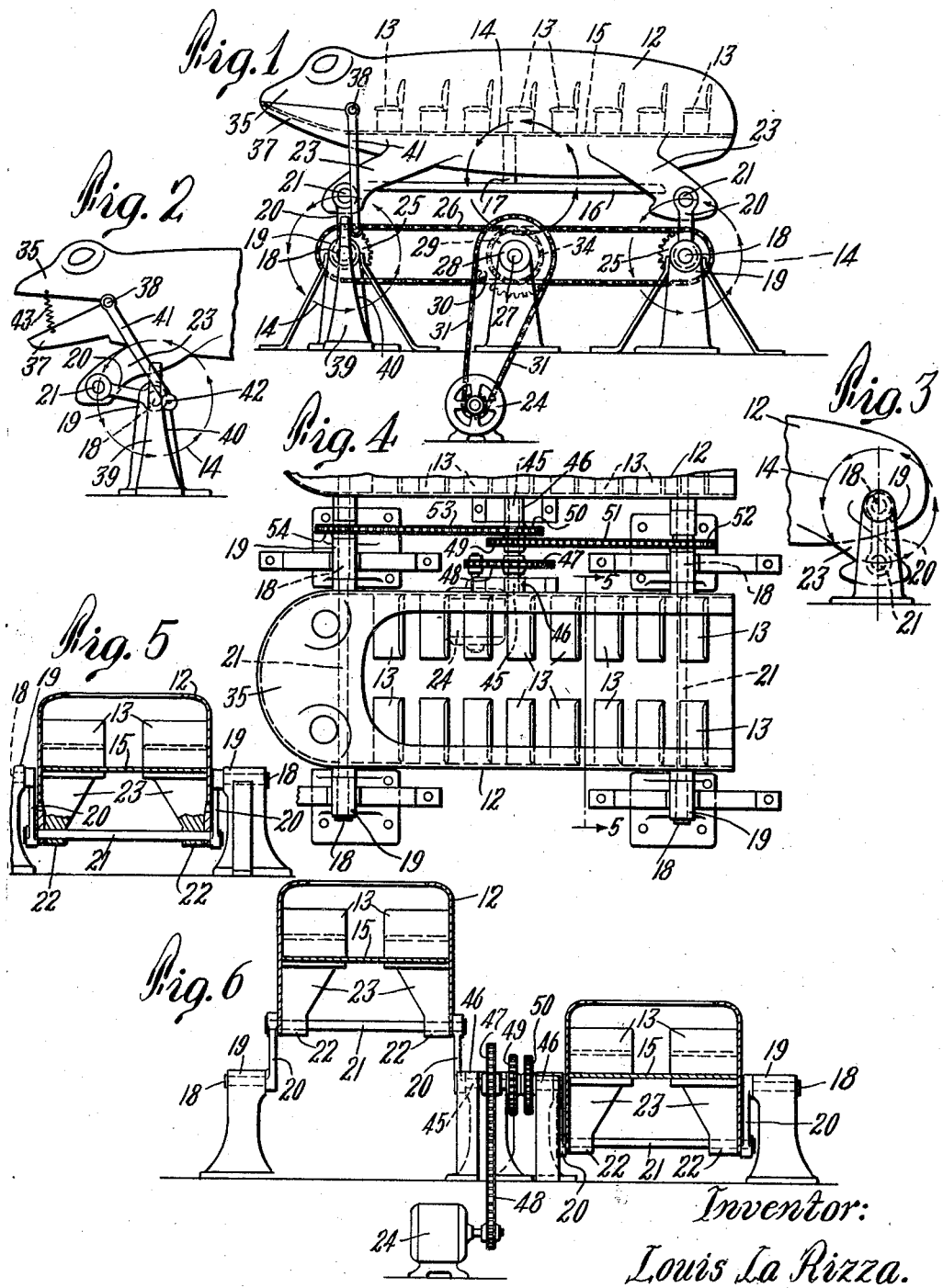
Inventor:
Louis La Rizza.

Patented May 5, 1931

1,803,397

UNITED STATES PATENT OFFICE

LOUIS LA RIZZA, OF REVERE, MASSACHUSETTS

AMUSEMENT DEVICE

Application filed April 3, 1930. Serial No. 441,410.

The chief object of this invention is to provide an amusement device comprising a movable body having a plurality of spaced apart stations, such as seats, for passengers, and mechanism for moving said body in such manner as to impart to each station or seat an orbital movement in a vertical plane, so that each passenger is alternately raised and lowered while moving in an orbital path, and experiences a thrill.

Other objects will hereinafter appear.

Of the accompanying drawings forming a part of this specification,—

Figure 1 is a side view of a single body amusement device embodying the invention, the body being raised.

Figures 2 and 3 are fragmentary side views, showing the end portions of the body, Figure 2 showing the body partly lowered, and Figure 3, completely lowered.

Figure 4 is a top plan view, showing a device including two bodies, one shown only in part.

Figure 5 is a section on line 5—5 of Figure 4, showing one body fully lowered.

Figure 6 is a transverse section showing both bodies in full.

The same reference characters indicate the same parts in all of the figures.

12 designates a movable body having a plurality of spaced apart stations 13, for passengers carried by the body, said stations being seats in this instance.

The body is supported by operating mechanism organized to alternately raise and lower the body and move it endwise in such manner as to impart to each station an orbital movement in a vertical plane, each station and a passenger thereat being moved in an orbit designated by the arrows 14, shown in Figure 1, each passenger being moved in a like orbit.

The body may be of any desired form, and as here shown simulates a frog, the body being hollow and having a floor 15, supporting the stations 13. The midlength portion of the floor may be supported by a longitudinal bar 16, fixed to end portions of the body, and a strut 17 extending between the bar and the floor.

Said operating mechanism includes two spaced apart horizontal crank shafts, each composed of alined members 18, journaled in fixed bearings 19, and crank arms 20 connected by horizontal wrist pins 21, journaled in bearings 22, on the opposite end portions of the body. In this instance, the bearings 22 are in body members 23 simulating the forward and rear legs of a frog. The crank shaft associated with the forward legs is hereinafter called the forward crank shaft, and the other the rear crank shaft.

Said crank shafts are rotated, and their wrist-pins revolved in unison by a motor 24 and torque-transmitting connections between the motor and the crank shafts.

In the embodiment shown by Figure 1, the device includes only one body 12. The torque-transmitting connections in this instance, include sprocket wheels 25, 25, fixed to the forward and rear crank shafts, a sprocket chain 26, connecting said wheels, an intermediate shaft 27 journaled in fixed bearings 28, and having a sprocket wheel 29 engaged with the chain 26, and another sprocket wheel 30, connected by a chain 31 with a sprocket wheel on the shaft of the motor 24.

The body is maintained in a horizontal position, and alternately raised as indicated by Figure 1, and lowered as indicated by Figures 2 and 3, so that the described orbital movement is imparted to the stations 12, the orbits of said stations being alike.

For spectacular effect the front end portion of the body may simulate a head including a jaw 35, fixed to the body, and a movable jaw 37, pivoted at 38 to the body, movable jaw-opening and closing mechanism being provided organized to open the movable jaw when the body is moved in one direction, and close said jaw when the body is moved in the opposite direction.

Said mechanism in this instance, comprises a rigid member 39, having a curved and inclined cam face 40, an arm member 41, fixed to the lower jaw, and having a runner, such as a trundle roll 42, movable on said cam face to open the lower jaw when the body is moving downward, and means, such as a spring 43 (Figure 2) adapted to automatically close the lower jaw when the body is moving upward.

Figures 4 and 6 show two bodies 12, located side by side, and torque-transmitting connections between the motor 24 and the crank shafts associated with said bodies, the arrangement of the crank shaft wrist-pins and of the torque-transmitting connections being such that each body is caused to descend while the other is rising, so that each body counterbalances the other, an object being to minimize the driving power required and enable the device to run more smoothly.

Each crank shaft is extended and includes two wrist-pins 21, one being offset from the crank axis oppositely from that of the other, as shown by Figure 6. The torque-transmitting connections in this instance include an intermediate shaft 45, journaled in fixed bearings 46 and having a sprocket wheel 47, driven through a chain 48 (Figure 6) by the motor 24, and two other sprocket wheels 49 and 50, one connected by a chain 51 (Figure 4) with a sprocket wheel 52 on the rear crank shaft, and the other by a chain 53 with a sprocket wheel 54 on the forward crank shaft.

I claim:

1. An amusement device comprising a movable body having a plurality of spaced apart stations for passengers, and operating mechanism organized to raise and lower the body and impart to each station an orbital movement in a vertical plane, said mechanism including forward and rear horizontal crank shafts journaled in fixed bearings and having offset wrist-pins journaled in bearings on end portions of the body, a motor, and torque-transmitting connections between it and the crank shafts, adapted to rotate said shafts and revolve their wrist-pins in unison.

2. An amusement device comprising two movable bodies located side by side, each having spaced apart stations for passengers, and operating mechanism organized to raise and lower each body and impart to each station an orbital movement in a vertical plane, said mechanism including forward and rear horizontal crank shafts journaled in fixed bearings and having offset wrist-pins journaled in bearings on end portions of said bodies, a motor, and torque-transmitting connections between the motor and said crank shafts, adapted to rotate said shafts and revolve their wrist-pins in unison, the arrangement of the crank shafts and their wrist-pins being such that each body descends while the other rises, so that each body counterbalances the other.

3. An amusement apparatus as specified by claim 1, said body having an end portion simulating a head and including a jaw fixed to the body, and a movable jaw pivoted to the body, and movable jaw-opening and closing mechanism organized to open the movable jaw when the body is moving in one direction, and close said jaw when the body is moving in an opposite direction.

In testimony whereof I have affixed my signature.

LOUIS LA RIZZA.